Figure 1:
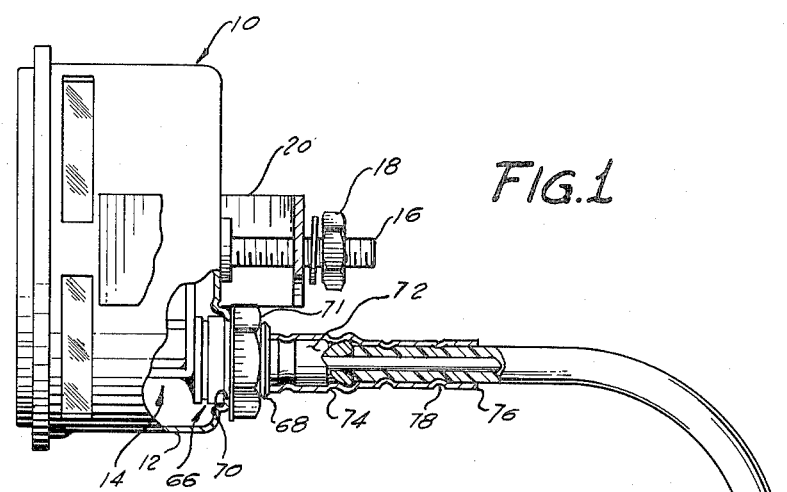

May 17, 1966  P. N. HANEBUTH  3,251,228

TEMPERATURE SENSITIVE PRESSURE SYSTEM

Filed July 12, 1963

INVENTOR

Paul N. Hanebuth

By A. G. Douvas

Attorney

United States Patent Office 3,251,228
Patented May 17, 1966

3,251,228
TEMPERATURE SENSITIVE PRESSURE SYSTEM
Paul N. Hanebuth, Elmhurst, Ill., assignor to Stewart-Warner Corporation, Chicago, Ill., a corporation of Virginia
Filed July 12, 1963, Ser. No. 294,643
3 Claims. (Cl. 73—368.4)

This invention relates to pressure systems of the type having a charge of temperature sensitive fluid confined in a closed circuit, and in particular, to capillary tubing used to communicate the fluid pressure in the circuit between a temperature sensing means and a pressure actuated means.

A typical temperature sensitive pressure system includes a charge of temperature sensitive fluid, confined in a substantially fixed volume, which responds to a temperature change with a corresponding pressure change. The closed system includes a pressure actuated means such as diaphragm, Bourdon tube or the like, a temperature sensing means such as a bulb or reservoir located proximate the area the temperature is to be sensed, and communicating means in the form of a conduit or tube intercommunicating the temperature sensing and pressure actuated means. A change of temperature of the temperature sensing means changes the fluid pressure within the closed system which is conveyed to the pressure actuated means. The pressure actuated means in turn actuates a control device such as a switch or valve, or an indicator device such as an instrument, in the manner desired.

The communicating means between the temperature sensing means and the pressure actuated means generally is a small diameter small bore capillary tube of steel or of brass. A conventional size is .080" O.D. and .030" I.D. Since the tube is of such small diameter, a helical coil of armor generally is positioned over the tube to strengthen it and to minimize direct damaging contact of some external object with it. The armor increases the cost of the tube because of the extra cost of the armor itself and because of the fabrication and labor required to cut the armor to proper mating length and subsequently slide it over the tube. Despite this, the sharp cut ends of the armor frequently cut and weaken the capillary tube to cause failure of the tube upon vibration or flexure of the tube. Moreover, the tube and armor commonly are electroconductive so that special routing care must be taken to prevent direct shorting with any adjacent electrical equipment. Similarly, corrosive atmospheric conditions, such as dampness on a marine installation, can cause damage to the coil and armor if the components are not corrosive or rust resistant. In this regard, brass frequently is used in lieu of steel, which though corrosive resistant, sacrifices strength and wearing capabilities as compared to steel.

Accordingly, the object of this invention is to provide in a temperature sensitive pressure actuated system an improved capillary tubing combination which is of light weight, withstands vibration, is easily fabricated to length, is impervious to corrosive ambient conditions, is a good dielectric, and is generally more serviceable though more economical than conventional coiled armor tubing.

Figure 2:
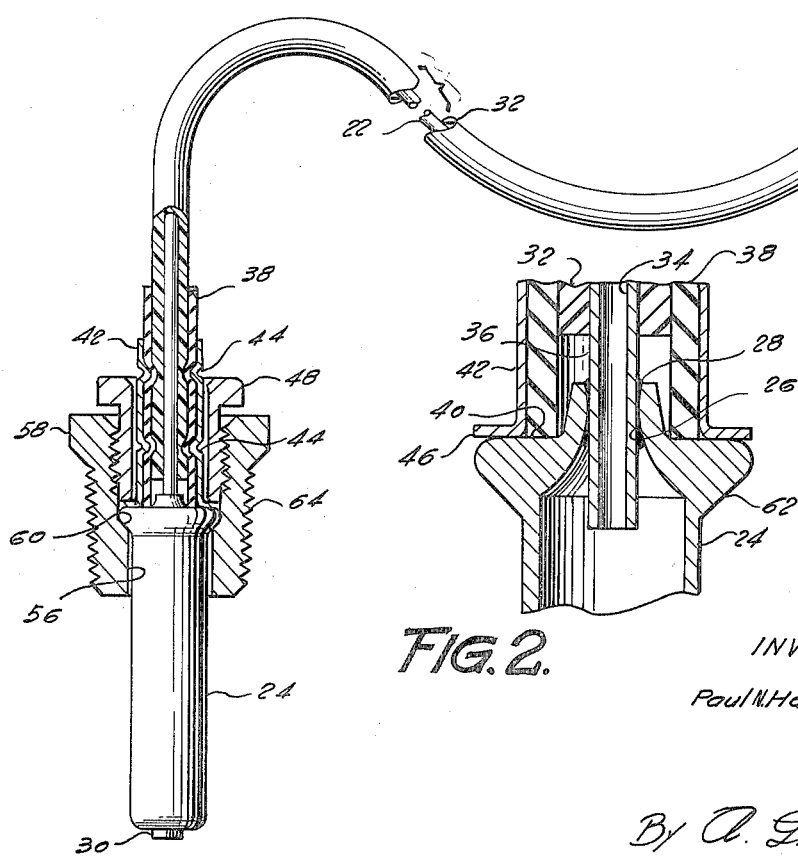

In order that this and other objects can be more fully appreciated, reference is herein made to the accompanying drawing, wherein:

FIG. 1 is an elevational view, partly in longitudinal cross-section, of a typical temperature sensitive pressure system of which this invention forms an improvement; and FIG. 2 is a longitudinal center section of the connection between a typical bulb and the capillary tubing as shown generally in FIG. 1.

FIG. 1 shows a typical temperature sensitive pressure indicating instrument for use as a water temperature gauge in the automative industry. The instrument 10 has a cup-shaped housing 12 which houses therein a pressure actuated means 14. The pressure actuated means 14 can typically be a diaphragm or Bourdon tube which through appropriate mechanical linkages (not shown) actuates a pointer (not shown) across a dial face (not shown) effective to indicate the instantaneous pressure of the instrument. Details of construction or operation of typical pressure actuated means can be found in Patent No. 2,332,103, issued October 19, 1943, to I. E. Mather, entitled, Pressure Gauge; or in Patent No. 2,502,559 issued April 4, 1952, to G. E. Coxson, entitled, Electric Pressure Responsive Device. The instrument 10 further includes at least one threaded stud 16 having a nut 18 and a bracket 20 which are used to mount the instrument in an appropriate manner to some external support (not shown) such as the dash panel of an automotive vehicle.

The pressure sensing means 14 communicates through a capillary tubing 22 to a hollow temperature sensitive bulb 24 (see FIG. 2). The bulb 24 typically is a cylindrical container originally open at both ends. One end of the tubing 22 is inserted into the bulb 24 through opening 26, and is secured and fixed thereto such as by means of silver soldering at 28. The entire system including the pressure responsive means 14, the tubing 22 and the bulb 24 is charged with a temperature sensitive fluid through the opening (not shown) at the opposite end of the bulb. A metal plug 30 is then driven into the opening and silver soldered to close the system with a mechanically secured and fluid-tight seal.

The temperature sensitive fluid can be all liquid such as in a solid fill system to expand or contract with changes in temperature, or can be a liquid-vapor as in the vapor pressure system. The confined temperature sensitive fluid, when subjected to a temperature difference within the normal operating temperature of the device, responds with a corresponding pressure change. Since the pressure in the entire system is uniform and dependent on the temperature of the bulb 24, the fluid pressure is conveyed through the capillary tubing to actuate the pressure actuated means 14. Various typical fluids used, depending on the desired operating temperature range, are propane, isobutane, ethyl ether, benzene, and the various Freons 11, 22 and 113.

The subject improvement includes providing the tubing 22 with an outer protective plastic covering 32 along its length extending generally within the connections at the opposite ends of the tubing. The plastic covering 32 can be extruded directly over the tubing 22 by generally conventional extrusion means to completely surround the tubing. For a .080" O.D. tube, a covering of .050" thickness is ample. This covering 32 gives greatly improved or complete protection for the capillary tubing as will be outlined.

Since the plastic covering 32 closely grasps the tubing, the combination of the plastic covering 32 and the tubing 22 dampens possible vibration of the tubing 22. Plastic has a high strength to weight ratio and long fatigue life for this purpose. The plastic covering 32 having high dielectric strength effectively insulates the tubing electrically to simplify the routing of the covered tubing past electrical components. The plastic covering is highly impervious to moisture, or corrosion, or chemical attack, so that it is possible to use a tube of normally corrosive but highly structural material, such as of steel, in a corrosive atmosphere such as in marine use without any sacrifice in strength or wearing ability. Polypropylene is a very desirable plastic for the covering 32 since it has all the characteristics listed and is most economical in cost.

A typical connection of the improved covered capillary tubing to the bulb 24 is shown in detail in FIG. 2. It is noted that the tubing 22 is hollow having a bore 34 along its length. The protective covering 32 on the tubing 24 is stripped at its end at 36, inserted into the open bore 26 in the bulb 24, and sealed thereto by means of solder 28 previously mentioned. Since there is no molecular bond between the tubing 22 and the covering 32, this stripping is readily performed. A rubber sleeve 38 fitted on the tubing 22 over the covering 32 is slid along the tubing until it abuts shoulder 40 of the bulb 24 to seal against the ingress of moisture or the like to the stripped tubing 36. A metal ferrule 42 is also slid along the tubing over the rubber sleeve 38 and crimped annularly in place as at 44 to fix the sleeve 38 and ferrule 42 relative to the tubing 22, bulb 24 and covering 32. The flanged end 46 of the ferrule 44 abutting the shoulder 40 of the bulb 24 also strengthens the connection laterally between the tubing and bulb.

A typical connection for holding the bulb 24 securely relative to an engine is shown in FIG. 1 and includes nut 48 similarly positioned on the tubing 22 over the covering 32 and adapted to slide over ferrule 42 until its end abuts the flange 46. The nut 48 has external threads 54 adapted to be threaded into a bore 56 of an adaptor member 58. The bore 56 of the adaptor 58 is stepped to provide a shoulder 60 against which the tapered shoulder 62 of the bulb 24 abuts. Thus, by threading the nut 48 into the threaded bore 56 of the adaptor 58 the bulb 24 is secured rigidly to the adaptor. Similarly, the adaptor 58 has external threads 64 adapted to be threaded into a similar threaded opening (not shown) in an engine, for example, to emerse the bulb 24 in the coolant water of the engine.

The connection of the pressure actuated means 14 to the tubing is functionally similar to that show in detail at the bulb end of the tubing. The stripped end of the tubing is inserted into and soldered to a hollow stud member 66 communicating with the pressure actuated means 14. The stud member 66 is secured to the pressure actuated means and has a threaded portion 68 adapted to fit through opening 70 in the housing 12 of the instrument 10. The nut 71 threaded onto the threaded portion 68 of the stud 66 secures the pressure actuated means 14 rigidly within the instrument housing 12. The stud further includes an elongated stem portion 72 having spaced annular grooves 74 therein. A ferrule 76 fits over the stem portion 72 of the stud 66 and a limited portion of the covering 32 on the tubing 22, and is adapted to be crimped annularly over the grooves and at several locations over the covering designated generally at 78 to secure and generally seal the covering 32 to the stud 66.

Thus the tubing 22 is completely separated by the covering 32 and ferrules 42 and 76 from direct exposure to the ambient atmosphere. The tubing 22 thus can be routed between the pressure actuator 14 at one location and the temperature sensing bulb 24 at some spaced location in an improved expedient manner without regard to ambient conditions. The improved combination, although rendering improved performance over known prior temperature sensitive pressure systems, is more economical than any of such systems.

While only a single embodiment of the subject invention has been shown, various modifications can be made which fall within the inventive scope of this disclosure. Accordingly, it is desired that the invention be limited only by the scope of the claims hereinafter following.

What is claimed is:

1. A temperature sensitive pressure system, comprising the combination of a temperature sensing bulb to be fixed in one position, a pressure actuated device to be fixed in another position spaced from said one position and responsive to changes in fluid pressure, a capillary tube interconnecting the temperature sensing bulb and the pressure actuating device with a sealed connection from said tube to both said bulb and device to form a closed system, a charge of temperature sensitive fluid in the system, said capillary tube being of small outer diameter and small bore, a plastic covering tube of a generally uniform cross-section substantially .050" thick with the inner diameter of said covering tube substantially identical to the outer diameter of said capillary tube and each end of said covering tube terminating adjacent the respective sealed connection of said capillary tube with said bulb and said device and spaced from the respective sealed connection, and rigid means to seal the space between the ends of the plastic covering tube and the adjacent temperature sensitive bulb and pressure actuated device to prevent contact between atmospheric gases and said capillary tube for preventing corrosion of said capillary tube and said rigid means is clamped to said covering tube and enabling said capillary tube to be secured from movement relative to said bulb and device in said respective fixed positions.

2. A temperature sensitive pressure system, comprising the combination of a temperature sensing means formed generally of a hollow cylinder having an open bore adjacent one of its ends, a pressure actuated means having means therein sensitive to pressure changes and having an inlet connecting thereto including a hollowed member defining a bore, a capillary tubing of small diameter of the order of .080" and having therein a through-bore of diameter of the order of .030", a plastic covering for said tubing and having an inner diameter substantially identical to said .08 inches with the plastic covering being of generally uniform cross-section of thickness of the order of .050" generally centered on the tubing and extending generally to adjacent the ends of the tubing, the ends of the plastic covering being stripped from immediately adjacent the ends of the tubing so as to provide on each of the ends a short length of tubing void of the plastic covering, whereby the uncovered ends of the tubing are adapted to be received within the provided bores in the pressure actuated means and temperature sensing means, respectively, and to be fixed and sealed thereto such as by means of silver solder to provide a sealed pressure system, a charge of temperature sensitive fluid in the sealed system, respective annular means slidable over the plastic covering along the length thereof adapted to overlap the plastic covering adjacent a respective stripped end portion of the tubing between the plastic covering and the temperature sensitive or pressure actuated means, and to overlap or abut with the adjacent temperature sensitive or pressure actuated means so as to prevent ingress of moisture or the like to any portion of the uncovered tubing presented between the end of the plastic covering and the temperature sensitive or pressure actuated means, and means for fixing each said annular means to said plastic covering and to respective supports for anchoring said capillary tube against movement relative to said temperature-sensitive and pressure-actuated means respectively.

3. For use with a temperature sensitive pressure system including a temperature sensing means to be fixed to a first support, a pressure actuated means to be fixed to a second support, and a capillary tube connected in pressure communicating relationship between the temperature sensing and pressure actuated means with a sealed connection to said temperature sensing means and said pressure-actuated means respectively forming thereby a confined pressure system, and the entire system being charged with a temperature sensing fluid, the improvement comprising the combination of a plastic covering of approximately .050" thick extruded over the capillary tube so as to be unitary with the tube generally to the ends thereof to enclose the tube from the exterior, the ends of the plastic covering being stripped from the ends of the tube to present bar portions of the tube with opposite ends of said tube communicating with said sensing and pressure-actuated means and sealed respectively to said sensing and pressure-actuated means, respective slidable sleeve means at opposite ends of the capillary tube and plastic covering each being slidable along the length thereof until engagement generally with the temperature sensing or pressure actuated means effective to enclose the ends of the plastic covering in general sealed relationship with the end of the adjacent temperature sensing or pressure actuated means to prevent ingress of moisture or the like to the tube, and means for fixing each sleeve means to a respective one of said first and second supports and to said plastic covering for securing said capillary tube against movement relative to said temperature sensing and pressure-actuated means.

References Cited by the Examiner

UNITED STATES PATENTS

| | | | |
|---|---|---|---|
| 1,165,564 | 12/1915 | Amthor | 73—368.4 X |
| 1,331,553 | 2/1920 | Amthor | 73—368.6 X |
| 1,771,193 | 7/1930 | Schlaich | 73—368.4 |
| 2,099,899 | 11/1937 | Hedfield et al. | 73—368.4 |
| 2,924,099 | 2/1960 | Crawford | 73—368.4 |

DAVID SCHONBERG, *Acting Primary Examiner.*

LOUIS R. PRINCE, *Examiner.*

J. RENJILIAN, *Assistant Examiner.*